United States Patent
Shikama et al.

(10) Patent No.: US 12,126,900 B2
(45) Date of Patent: Oct. 22, 2024

(54) CAMERA DEVICE AND PORTABLE ELECTRONIC DEVICE WITH ANTI-SHAKE MECHANISM COMPRISING AT LEAST ONE COIL, AT LEAST ONE MAGNETIC STEEL, AND AT LEAST ONE MAGNETIC FLUID BODY

(71) Applicant: Changzhou AAC Raytech Optronics Co., Ltd., Changzhou (CN)

(72) Inventors: Kazuo Shikama, Osaka (JP); Takashi Iwasaki, Osaka (JP)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 92 days.

(21) Appl. No.: 18/087,752

(22) Filed: Dec. 22, 2022

(65) Prior Publication Data
US 2024/0080558 A1     Mar. 7, 2024

(30) Foreign Application Priority Data

Sep. 2, 2022   (JP) .................................. 2022-140268

(51) Int. Cl.
| H04N 5/335 | (2011.01) |
| G02B 7/08 | (2021.01) |
| G02B 7/09 | (2021.01) |
| G02B 7/10 | (2021.01) |
| H04N 23/51 | (2023.01) |
| H04N 23/55 | (2023.01) |
| H04N 23/57 | (2023.01) |
| H04N 23/68 | (2023.01) |

(52) U.S. Cl.
CPC ............ *H04N 23/682* (2023.01); *G02B 7/08* (2013.01); *G02B 7/09* (2013.01); *G02B 7/10* (2013.01); *H04N 23/51* (2023.01); *H04N 23/55* (2023.01); *H04N 23/57* (2023.01)

(58) Field of Classification Search
CPC .................................................. H04N 23/682
See application file for complete search history.

(56) References Cited

U.S. PATENT DOCUMENTS

| 7,389,519 B2 * | 6/2008 | Yamanaka | ............. G11B 7/123 |
| 2004/0223423 A1 * | 11/2004 | Tsuda | ..................... H04R 9/04 |
| | | | 369/44.16 |

(Continued)

FOREIGN PATENT DOCUMENTS

JP            6703284 B1      6/2020

*Primary Examiner* — Gary C Vieaux
(74) *Attorney, Agent, or Firm* — W&G Law Group

(57) ABSTRACT

A camera device and a portable electronic device are provided. The camera device includes a camera lens and an anti-shake mechanism. The anti-shake mechanism includes a base, a supporting frame, a driving member, and a supporting member. The camera lens is fixed to the supporting frame. The driving member includes at least one coil and at least one magnetic steel. The driving member is configured to drive the supporting frame to move relative to the base in a direction perpendicular to the optical axis, and the supporting member is arranged between the supporting frame and the base to support movement of the supporting frame. The anti-shake mechanism further comprises at least one magnetic fluid body arranged on at least one of the base and the supporting frame.

18 Claims, 13 Drawing Sheets

(56) References Cited

U.S. PATENT DOCUMENTS

| | | | |
|---|---|---|---|
| 2006/0018645 A1* | 1/2006 | Stavely | H04N 23/687 |
| | | | 348/E5.046 |
| 2017/0090211 A1* | 3/2017 | Ollila | H04N 23/57 |
| 2020/0244887 A1* | 7/2020 | Ishida | H04N 23/60 |
| 2021/0377450 A1* | 12/2021 | Shabtay | G02B 15/143103 |

* cited by examiner

CAMERA DEVICE AND PORTABLE ELECTRONIC DEVICE WITH ANTI-SHAKE MECHANISM COMPRISING AT LEAST ONE COIL, AT LEAST ONE MAGNETIC STEEL, AND AT LEAST ONE MAGNETIC FLUID BODY

TECHNICAL FIELD

The disclosure relates to the field of optical technologies, and more particularly to a camera device and a portable electronic device.

BACKGROUND

With the development of photography technology, camera devices with anti-shake and auto-focus functions are widely used in cameras and various portable electronic devices, such as mobile phones, tablet computers, and notebook computers. At present, in terms of anti-shake, a suspension wire is generally used to provide force in a direction perpendicular to an optical axis of a camera lens to support the camera lens.

However, in a camera device having a relatively large focusing range, when a driving range and weight of the camera lens are relatively large, the suspension wire may be easily damaged and permanently deformed due to stress concentration, and the suspension wire may be bent, broken, or detached due to falling, which may lead to the failure of the camera device. To improve the strength of the suspension wire by increasing the size of the suspension wire, it is also necessary to increase the volume of a magnetic steel to increase the thrust to match the strength of the suspension wire, which may lead to increase of the volume of the camera device. In addition, while increasing the volume of the camera lens and the shooting element to improve the imaging quality, the weight of the camera lens also increases, which may cause the camera lens to tilt, and may also be contrary to miniaturization design of the electronic device. Furthermore, the suspension wire for supporting is a spring suspension structure in essence, and the spring suspension structure is difficult to adjust spring characteristics, which may be unfacilitated to anti-shake control. Furthermore, a secondary resonance generated at a first resonance point during shaking may also reduce control performance of the camera device.

Therefore, it is necessary to provide a camera device and a portable electronic device to solve the above problems.

SUMMARY

Embodiments of the disclosure aim to provide a camera device and a portable electronic device, so as to solve technical problems that photographing quality is reduced since a camera lens cannot be quickly reset due to ripple and secondary resonance generated during shaking of the camera lens, is easily damaged, is large in volume, heavy in weight, and low in anti-shake performance.

To solve the above problems, embodiments of the disclosure provide a camera device. The camera device includes a camera lens and an anti-shake mechanism. The anti-shake mechanism includes a base, a supporting frame, a driving member, and a supporting member. The camera lens is fixed to the supporting frame. The driving member includes at least one coil and at least one magnetic steel. The driving member is configured to drive the supporting frame to move relative to the base in a direction perpendicular to the optical axis, and the supporting member is arranged between the supporting frame and the base to support movement of the supporting frame. The anti-shake mechanism further comprises at least one magnetic fluid body arranged on at least one of the base and the supporting frame.

In some embodiments, the at least one coil is fixed to the base and the at least one magnetic steel is fixed to the supporting frame; or the at least one coil is fixed to the supporting frame and the at least one magnetic steel is fixed to the base.

In some embodiments, the driving member includes a first driving member and second driving member. The first driving member is configured to drive the supporting frame to move in a direction parallel to a first direction. The second driving member is configured to drive the supporting frame to move in a direction parallel to a second direction. The first direction and the second direction are perpendicular to each other.

In some embodiments, the first driving member comprises a first magnetic steel fixed to the supporting frame and a first coil fixed to the base, and the second driving member comprises a second magnetic steel fixed to the supporting frame and a second coil fixed to the base.

In some embodiments, the first driving member comprises a first magnetic steel fixed to the base and a first coil fixed to the supporting frame, and the second driving member comprises a second magnetic steel fixed to the base and a second coil fixed to the supporting frame.

In some embodiments, the at least one magnetic fluid body comprises two first magnetic fluid bodies arranged in a direction parallel to a short axis of the first coil and two second magnetic fluid bodies arranged in a direction parallel to a short axis of the second coil. One first magnetic fluid body of the two first magnetic fluid bodies is arranged on one side of the first coil and an other first magnetic fluid body of the two first magnetic fluid bodies is arranged on another side of the first coil. One second magnetic fluid body of the two second magnetic fluid bodies is arranged on one side of the second coil and an other second magnetic fluid body of the two second magnetic fluid bodies is arranged on another side of the second coil.

In some embodiments, the at least one magnetic fluid body comprises two third magnetic fluid bodies arranged in a direction parallel to a short axis of the first magnetic steel and two fourth magnetic fluid bodies arranged in a direction parallel to a short axis of the second magnetic steel. One third magnetic fluid body of the two third magnetic fluid bodies is arranged on one side of the first magnetic steel and an other third magnetic fluid body of the two third magnetic fluid bodies is arranged on another side of the first magnetic steel. One fourth magnetic fluid body of the two fourth magnetic fluid bodies is arranged on one side of the second magnetic steel and an other fourth magnetic fluid body of the two fourth magnetic fluid bodies is arranged on another side of the second magnetic steel.

In some embodiments, the driving member comprises a corresponding magnet yoke fixed to a side of each magnetic steel of the at least one magnetic steel away from the at least one coil and a corresponding fifth magnetic fluid body fixed to a side of each coil of the at least one coil away from the at least one magnetic steel.

In some embodiments, the supporting member is a ball.

In some embodiments, the camera device further includes a focusing mechanism provided on a side of the supporting frame away from the base, wherein the focusing mechanism is configured to drive the camera lens to move in a direction parallel to the optical axis to realize focusing.

In some embodiments, the camera device further includes a curved optical mechanism. The curved optical mechanism comprises a prism and a light guiding lens, wherein the prism is configured to change an extending direction of the optical axis.

In some embodiments, the camera device further includes a telescopic zoom mechanism. The telescopic zoom mechanism is extended out of or retracted into along the optical axis.

Embodiments of the disclosure further provide a portable electronic device. The portable electronic device includes a device body and the camera device described in any of above embodiments.

Implementing solutions of the disclosure has following advantages. The camera lens is fixed on a movable support frame relative to the base. The driving member includes a coil and a magnetic steel. One of the coil and the magnetic steel is fixed on the base and the other of the coil and the magnetic steel is fixed on the supporting frame. The driving member can drive the supporting frame to move relative to the base in a direction perpendicular to the optical axis. A supporting member is provided between the base and the supporting frame. The supporting member is configured to support the movement of the supporting frame. The anti-shake mechanism further includes at least one magnetic fluid body provided on the base and/or the supporting frame. In this way, the supporting member and the at least one magnetic fluid body are used to replace a suspension wire. With the magnetic attraction of the magnetic fluid body to the magnetic component having a closed magnetic field, braking of the camera lens during shaking may be realized, and ripple and secondary resonance may be effectively suppressed, thereby solving the problem that the suspension wire may be easily damaged or permanently deformed due to the weight of the camera lens. Therefore, the camera lens can be quickly reset, the volume and weight of the camera device can be reduced, the anti-shaking performance can be improved, and thus the shooting quality of the camera device can be improved.

BRIEF DESCRIPTION OF THE DRAWINGS

One or more embodiments are illustrated by the pictures in the corresponding drawings, which are not to be limiting to the embodiments. Elements having same reference numeral numerals in the drawings are represented as similar elements, and the figures in the drawings are not to be scale limiting unless otherwise stated.

Figure 1:
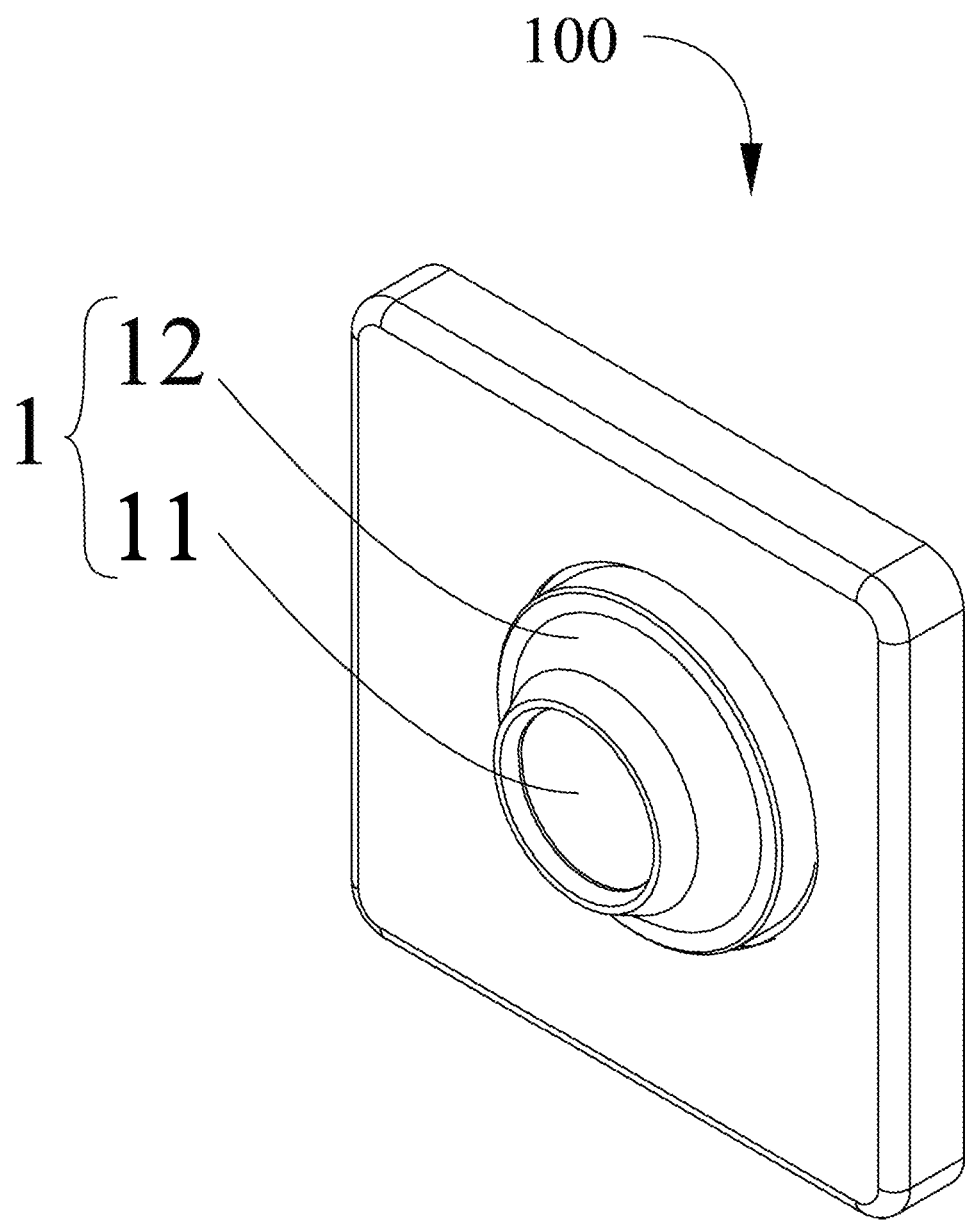
FIG. 1 is a schematic structural view of an anti-shake mechanism of a camera device according to a first embodiment of the disclosure.

Reference numbers in figures are illustrated as follows.
1 camera lens
11 lens
12 lens tube
2 anti-shake mechanism
21 base
211 first receiving groove
212 first fixing groove
213 second fixing groove
214 first fluid receiving groove
215 second fluid receiving groove
22 supporting frame
221 second receiving groove
222 supporting member
223 first mounting groove
224 second mounting groove
23 driving member
231 coil 2311 first coil
2312 second coil
232 magnetic steel
2321 first magnetic steel
2322 second magnetic steel
233 magnet yoke
2331 first magnet yoke
2332 second magnet yoke
2333 third magnet yoke
2334 fourth magnet yoke
234 flexible circuit board
24 magnetic fluid body
241 first magnetic fluid body
242 second magnetic fluid body
25 housing
3 optical axis
50 lens driving device
51 focusing mechanism
60 curved optical mechanism
61 prism
62 light guiding lens
70 telescopic zoom mechanism
71 driving motor
100 camera device
200 portable electronic device
210 device body
P1 first direction
P2 second direction
F1 first magnetic force
F2 second magnetic force
F3 third magnetic force
F4 fourth magnetic force

DETAILED DESCRIPTION OF THE EMBODIMENTS

In order to enable the object, technical solutions, and advantages of the embodiments of the disclosure clearer, embodiments of the disclosure may be described in detail below with reference to accompanying drawings. However, one of ordinary skill in the art may appreciate that in various embodiments of the disclosure, numerous technical details have been provided to better understand the application for the reader. It can be understood that even without these technical details and variations and modifications based on the following embodiments, the technical solutions herein may be realized.

In embodiments of the disclosure, terms "up", "down", "left", "right", "front", "back", "top", "bottom", "inside", "outside", "middle", "vertical", "horizontal", "transverse", "longitudinal", and the like indicating an orientation or positional relationship are orientation or positional relationship based on the drawings. These terms are mainly intended to better describe the disclosure and embodiments of the disclosure and are not intended to limit that the indicated device, element, or component must have a particular orientation or be constructed and operated in the particular orientation.

In addition, some of the above terms may be used to express other meanings besides the orientation or positional relationship. For example, the term "up" may also be used to express a certain attachment or connection relationship in some cases. The specific meanings of these terms in the disclosure may be understood by those of ordinary skill in the art according to actual situations.

Furthermore, terms "installation", "set-up", "providing", "definition", "connection", and "coupling" should be understood broadly. For example, the "connection" and "coupling" can be understood as a fixed connection, a detachable connection, or a monolithic construction. Alternatively, the "connection" and "coupling" can be understood as a mechanical connection or an electrical connection, or a direct connection, or indirect connection through an intermediate medium. Alternatively, the "connection" and "coupling" may indicate internal connection between two devices, elements, or components. The specific meanings of the above terms in the disclosure may be understood by those of ordinary skill in the art according to actual situations.

Furthermore, terms "first", "second", etc. are mainly used to distinguish from different devices, elements, or components (specific types and configurations of the devices, elements, or components may be the same or different), and are not intended to indicate or imply the relative importance and quantity of the indicated devices, elements, or components. Unless otherwise stated, "multiple/a plurality of" means two or more.

The following describes the implementation details of the camera device, a camera, and a portable electronic device of embodiments in detail. The following content is only for the convenience of understanding the implementation details provided, and is not necessary to implement this solution.

Figure 2:
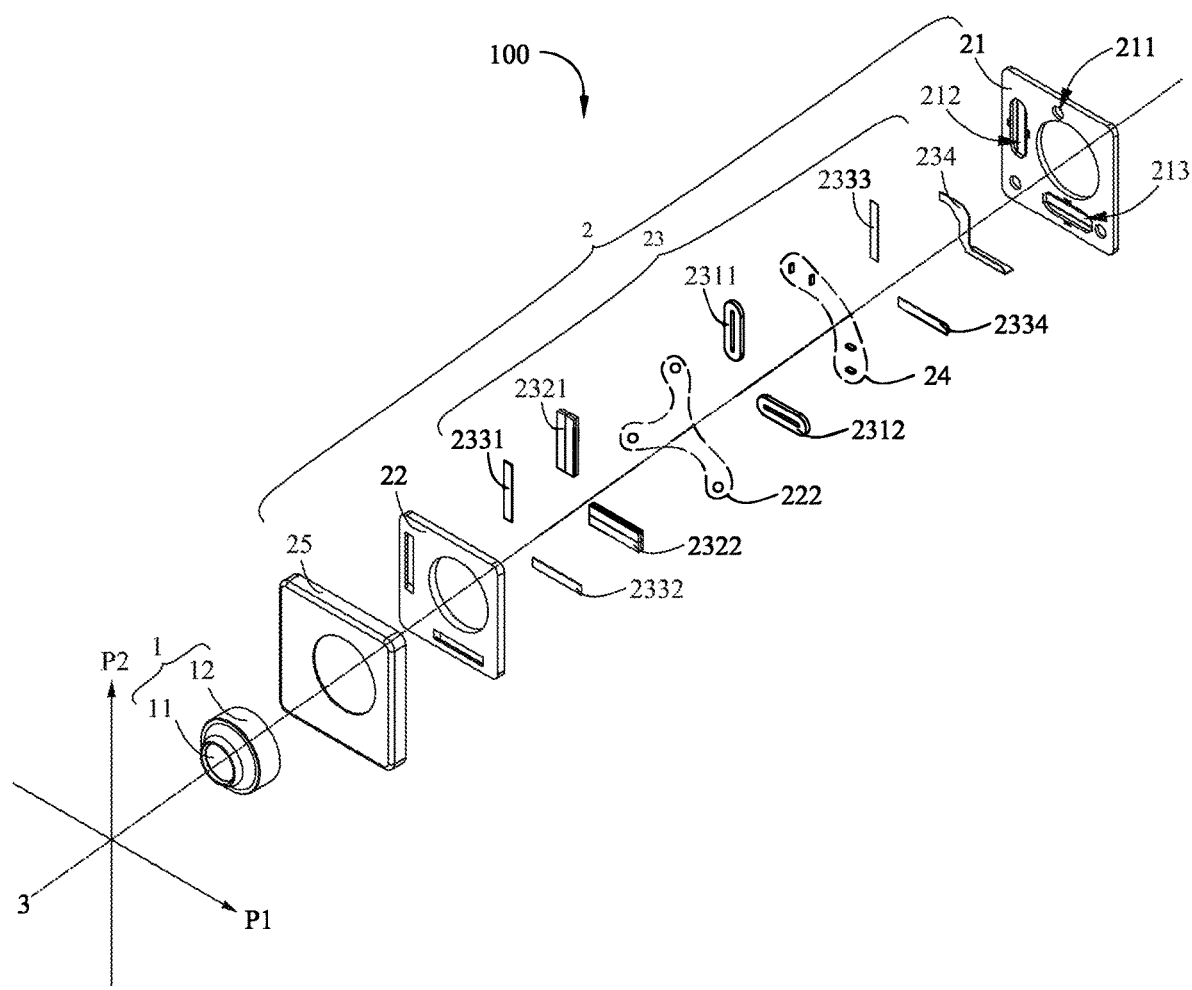
FIG. 2 is an exploded view of the anti-shake mechanism of the camera device according to the first embodiment of the disclosure.
Figure 3A:
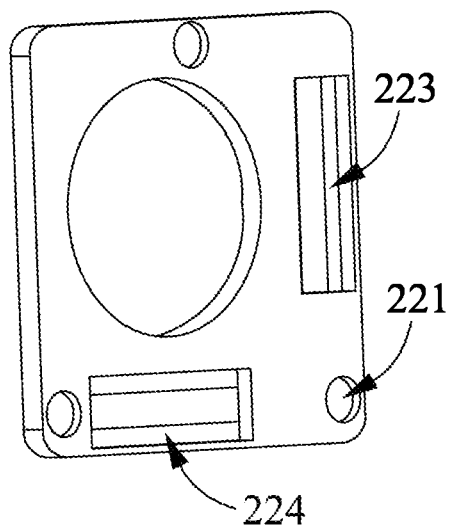
FIG. 3a is a schematic structural view of a supporting frame of the anti-shake mechanism of the camera device according to the first embodiment of the disclosure.
Figure 3B:
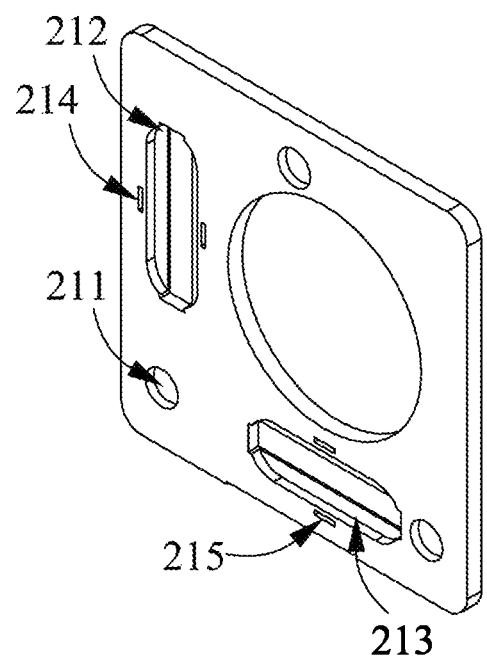
FIG. 3b is a schematic structural view of a base of the anti-shake mechanism of the camera device according to the first embodiment of the disclosure.
Figure 4:
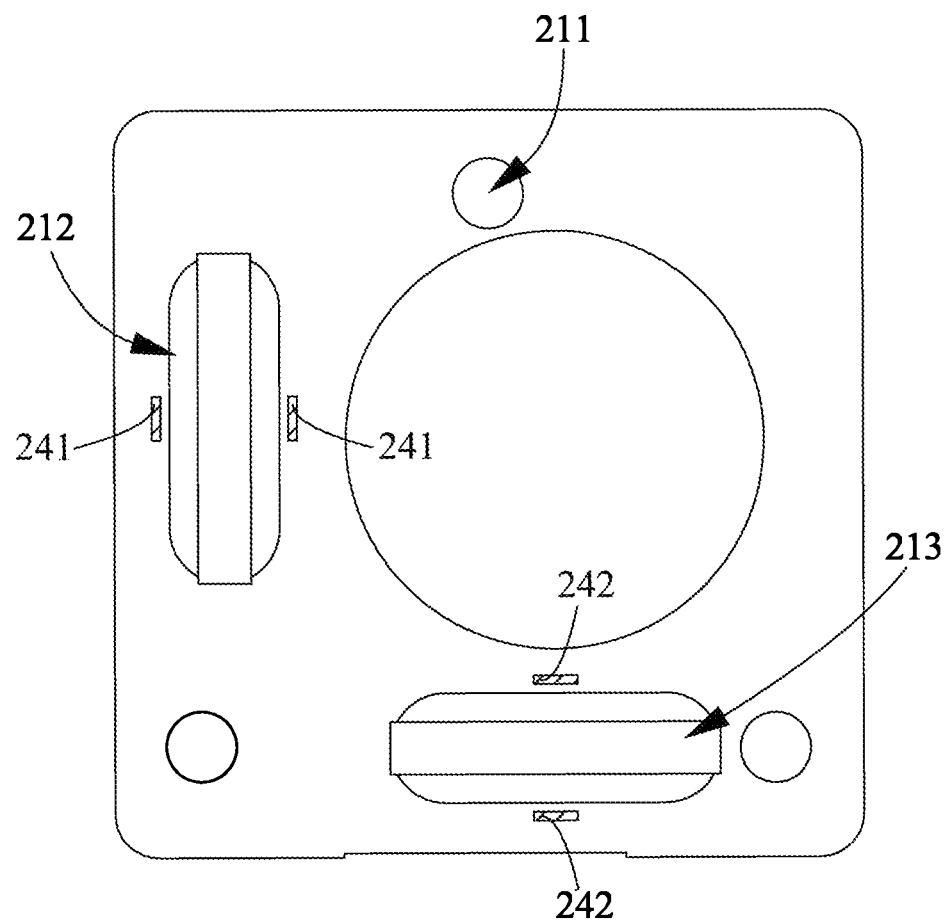
FIG. 4 is a front view of the base of the anti-shake mechanism of the camera device according to the first embodiment of the disclosure.
Figure 5:
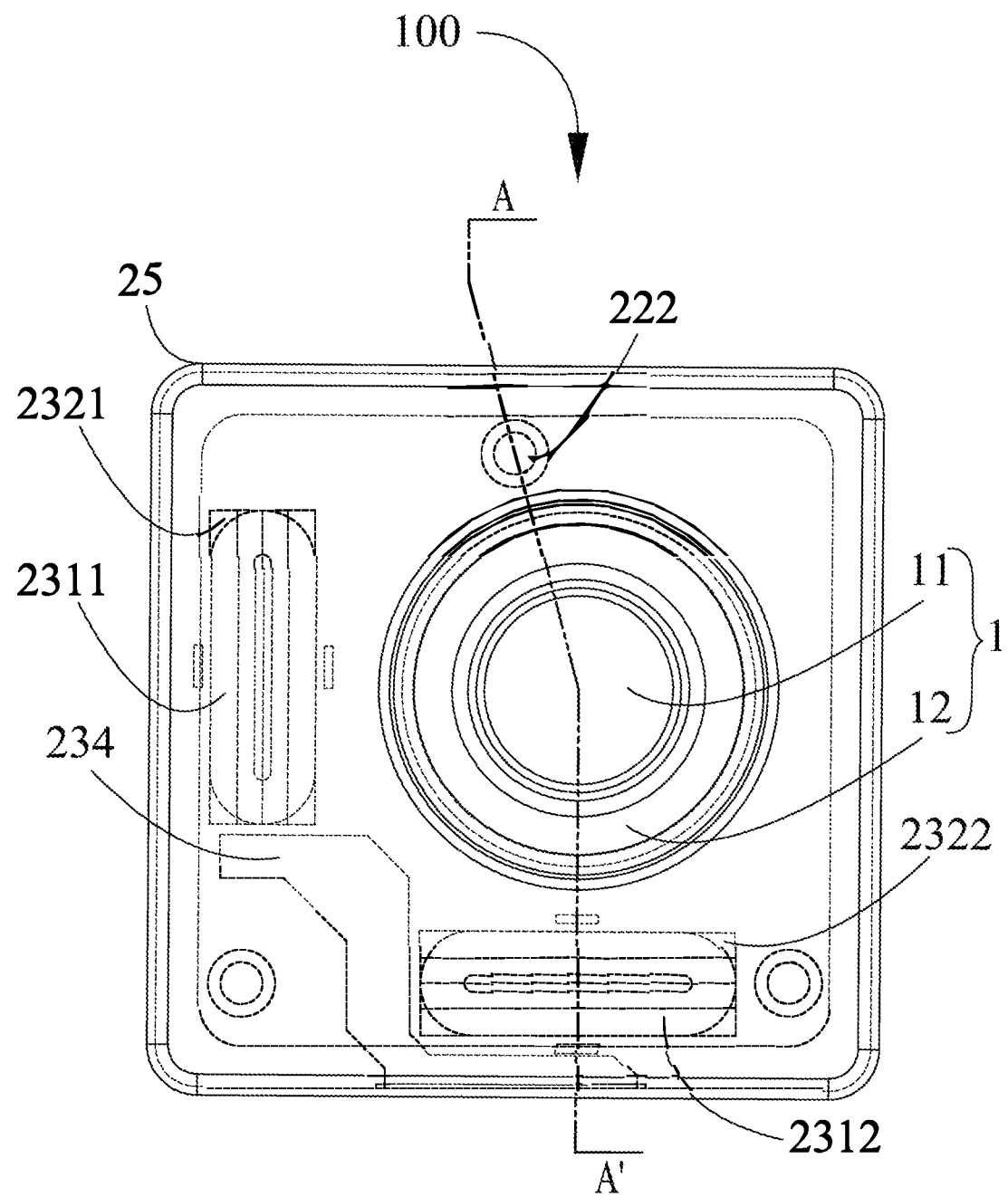
FIG. 5 is a front view of the anti-shake mechanism of the camera device according to the first embodiment of the disclosure.
Figure 6:
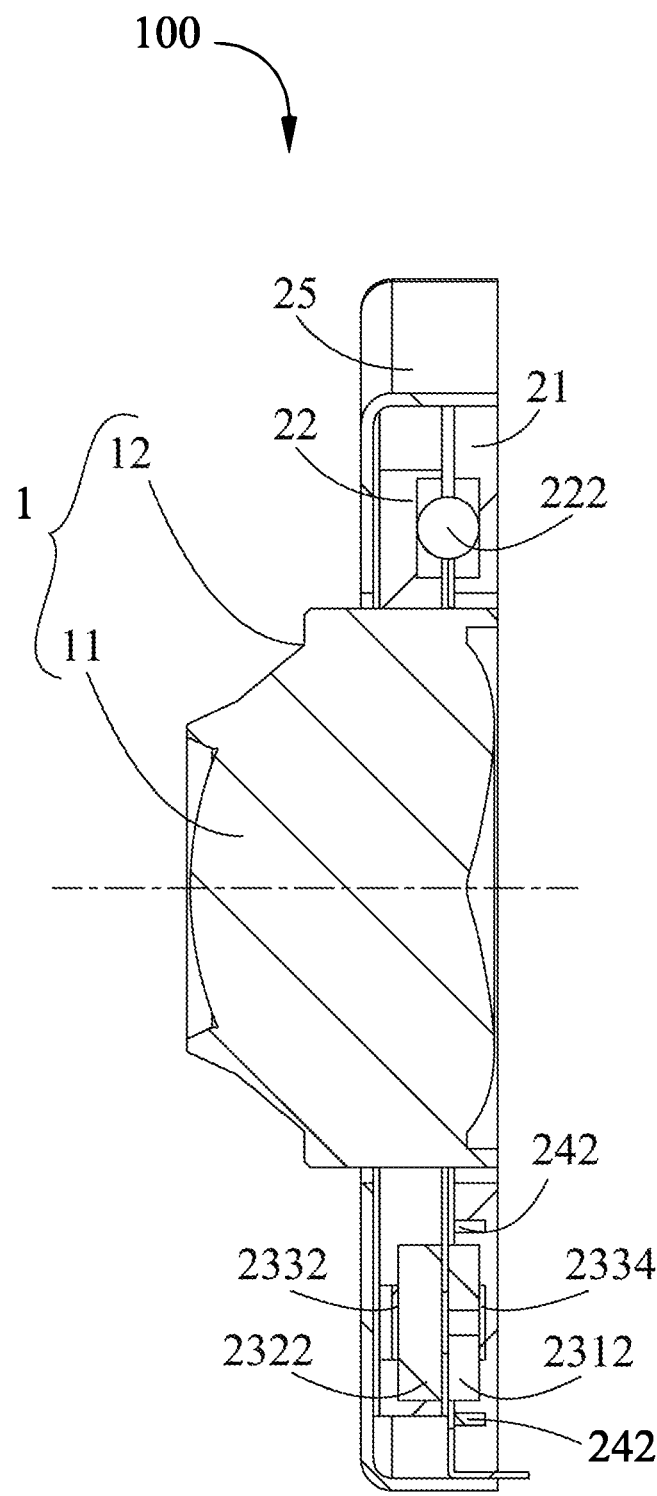
FIG. 6 is a schematic cross-sectional view of FIG. 5 along the line AA'.

A camera device 100 in the first embodiment of the disclosure is illustrated in FIGS. 1-3. The camera device 100 includes a camera lens 1 and an anti-shake mechanism 2. The anti-shake mechanism 2 includes a base 21, a supporting frame 22, a driving member 23, and a supporting member 222. The camera lens 1 is fixed to the supporting frame 22. The driving member 23 includes at least one coil 231 and at least one magnetic steel 232. One of the at least one coil 231 and the at least one magnetic steel 232 is fixed to the base 21, and the other of the at least one coil 231 and the at least one magnetic steel 232 is fixed to the supporting frame 22. The driving member 23 is operable to drive the supporting frame 22 to move relative to the base 21 in a direction perpendicular to an optical axis 3. The supporting member 222 is provided between the supporting frame 22 and the base 21 to support the movement of the supporting frame 22. The anti-shake mechanism 2 further includes at least one magnetic fluid body 24 provided on the base 21 and/or the supporting frame 22.

Compared with related technologies, in the first embodiment of the disclosure, the supporting member 222 and the magnetic fluid body 24 are used to replace the suspension wire. With the magnetic attraction of the magnetic fluid body 24 to the magnetic component having a closed magnetic field, braking of the camera lens 1 during shaking may be realized, and ripple and secondary resonance may be effectively suppressed, thereby solving the problem that the suspension wire may be easily damaged or permanently deformed due to the weight of the camera lens 1. Therefore, the camera lens 1 can be quickly reset, the volume and weight of the camera device 100 can be reduced, the anti-shaking performance can be improved, and thus the shooting quality of the camera device 100 can be improved.

In some embodiments, the camera lens 1 includes a lens 11 and a leans tube 12. The lens 11 is fixed to the lens tube 12. The base 21 and the supporting frame 22 each have a rounded polygon shape.

In the above-described configuration, the coil 231 and/or the magnetic steel 232 may also be attracted by the magnetic fluid body 24 even in an unenergized state. That is, a magnetic force of the magnetic fluid body 24 can attract the camera lens 1 back to the optical axis 3 of the camera device 100 as an elastic force.

In some embodiments, one of the at least one coil 231 and the at least one magnetic steel 232 is fixed to the base 21 and the other of the at least one coil 231 and the at least one magnetic steel 232 is fixed to the supporting frame 22. For example, the at least one coil 231 is fixed to the base 21, and the at least one magnetic steel 232 is fixed to the supporting frame 22. Alternatively, the at least one coil 231 is fixed to the supporting frame 22, and the at least one magnetic steel 232 is fixed to the base 21. In some embodiments, the at least one magnetic fluid body 24 is provided on the base 21 and/or the supporting frame 22. For example, the at least one magnetic fluid body 24 is provided on the base 21. Alternatively, the at least one magnetic fluid body 24 is provided on the supporting frame 22. Alternatively, the at least one magnetic fluid body 24 is provided on the base 21 and the supporting frame 22. In the first embodiment of the disclosure, the at least one coil 231 being fixed to the base 21, the at least one magnetic steel 232 being fixed to the supporting frame 22, and the at least one magnetic fluid body 24 being provided on the base 21 are taken as an example for illustration.

In some embodiments, the supporting member 222 is a ball and the driving member 23 is a voice coil motor.

It can be understood that in the related technologies, the suspension wire is used to support the camera lens 1. When a driving range is relatively large or the camera lens 1 is relatively large heavy, the suspension wire is easy to be damaged or permanently deformed due to stress concentration. In addition, when the camera device 100 falls down, the suspension wire may also be bent and broken. By using the ball as the supporting member provided in embodiments, the anti-shake mechanism 2 can support the camera lens 1 more firmly. In addition, since the ball is used as the supporting member to replace the suspension wire, secondary resonance can be effectively suppressed when the camera lens 1 shakes, thereby improving the reliability of the camera lens 1.

Specifically, in embodiments of the disclosure, the at least one coil 231 includes a first coil 2311 and a second coil 2312, and the at least one magnetic steel 232 includes a first magnetic steel 2321 and a second magnetic steel 2322. The anti-shake mechanism 1 further includes at least one magnet yoke 233. The at least one magnet yoke 233 includes a first magnet yoke 2331 and a second magnet yoke 2332. The first coil 2311, the first magnetic steel 2321, and the first magnet yoke 2331 constitute a first driving member. The second coil 2312, the second magnetic steel 2322, and the second magnet yoke 2332 constitute a second driving member.

Furthermore, the base 21 defines a first fixing groove 212 and a second fixing groove 213. The supporting frame 22 defines a first mounting groove 223 and a second mounting groove 224. The first coil 2311 is disposed inside the first fixing groove 212. The second coil 2312 is disposed inside the second fixing groove 213. The first magnetic steel 2321 and a first magnet yoke 2331 are disposed inside the first mounting groove 223, and the first magnet yoke 2331 is disposed on a side of the first magnetic steel 2321 away from the first coil 2311. When the first coil 2311 is energized, a force in a first direction P1 or in a direction opposite to the first direction P1 is applied by the first coil 2311 to the first magnetic steel 2321. The second magnetic steel 2322 and the second magnet yoke 2332 are disposed inside the second mounting groove 224, and the second magnet yoke 2332 is disposed on a side of the second magnetic steel 2322 away from the second coil 2312. When the second coil 2312 is energized, a force in a second direction P2 or in a direction opposite to the second direction P2 is applied by the second coil 2312 to the second magnetic steel 2322. Therefore, by adjusting currents of the first coil 2311 and the second coil 2312, a magnitude and a direction of magnetic forces to the first magnetic steel 2321 and the second magnetic steel 2322 can be changed, so that the supporting frame 22 moves in a plane perpendicular to the optical axis 3, thereby driving the camera lens 1 to move in the plane perpendicular to the optical axis 3.

Referring back to FIG. 2, in embodiments, the at least one magnet yoke 233 further includes a third magnet yoke 2333 and a fourth magnet yoke 2334. The third magnet yoke 2333 is disposed inside the first fixing groove 212 and disposed on a side of the first coil 2311 facing away from the first magnetic steel 2321. The fourth magnet yoke 2334 is disposed inside the second fixing groove 213 and disposed on a side of the second coil 2312 facing away from the second magnetic steel 2322.

In embodiments of the disclosure, the driving member 23 further includes a flexible circuit board 234 provided on the base 21. The flexible circuit board 234 connects the first coil 2311 and the second coil 2312 and is configured to supply power to the first coil 2311 and the second coil 2312.

Referring to FIGS. 2 to 6, in embodiments of the disclosure, there are four magnetic fluid bodies 24. The four magnetic fluid bodies 24 include two first magnetic fluid bodies 241 and two second magnetic fluid bodies 242. One of two first fluid receiving grooves 214 is defined on one side of the first fixing groove 212, and the other of the two first fluid receiving grooves 214 is defined on the other side of the first fixing groove 212. One of two second fluid receiving grooves 215 is defined on one side of the second fixing groove 213, and the other of the two second fluid receiving grooves 215 is defined on the other side of the second fixing groove 213. One of the two first magnetic fluid bodies 241 is disposed in one of the two first fluid receiving grooves 214, and the other of the two first magnetic fluid bodies 241 is disposed in the other of the two first fluid receiving grooves 214. One of the two second magnetic fluid bodies 242 is disposed in one of the two second fluid receiving grooves 215 and the other of the two second magnetic fluid bodies 242 is disposed in the other of the two second fluid receiving grooves 215. That is, the two first magnetic fluid bodies 241 are respectively disposed on two opposite sides of the first coil 2311 in a direction parallel to a short axis of the first coil 2311, and the two second magnetic fluid bodies 242 are respectively disposed on two opposite sides of the second coil 2312 in a direction parallel to a short axis of the second coil 2312.

Figure 7A:
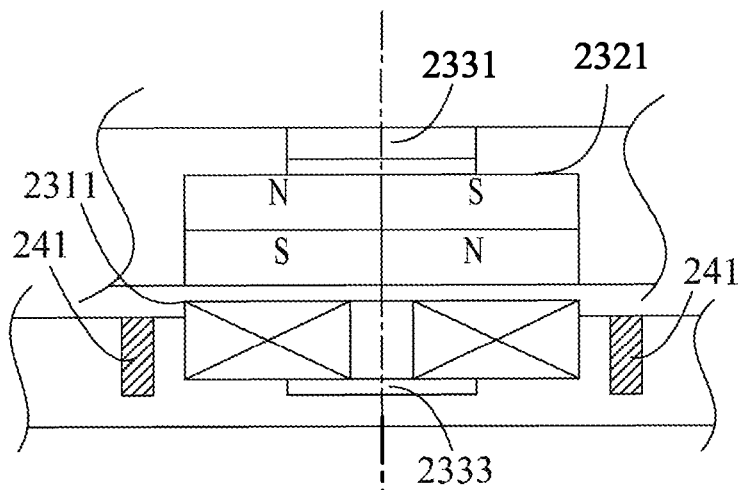
FIG. 7a is a schematic view of a magnetic fluid body of the anti-shake mechanism of the camera device being arranged on the base according to the first embodiment of the disclosure.
Figure 7B:
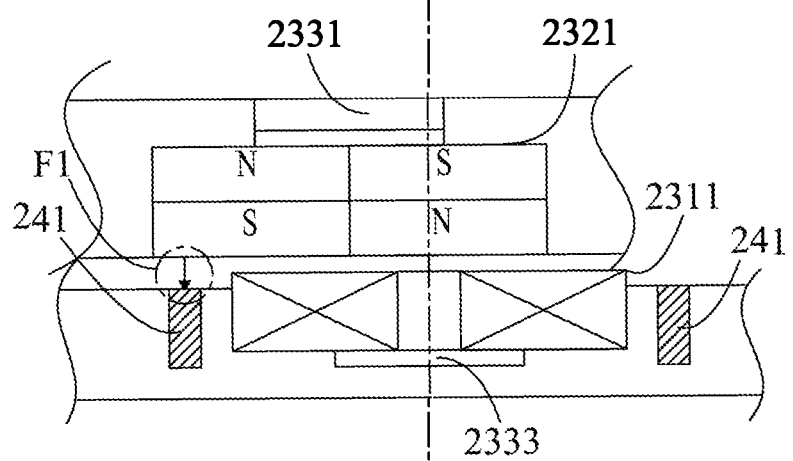
FIG. 7b is a schematic view illustrating a force being applied by the magnetic fluid body of the anti-shake mechanism of the camera device to a first magnetic steel when the camera lens moves in a first direction according to the first embodiment of the disclosure.
Figure 7C:
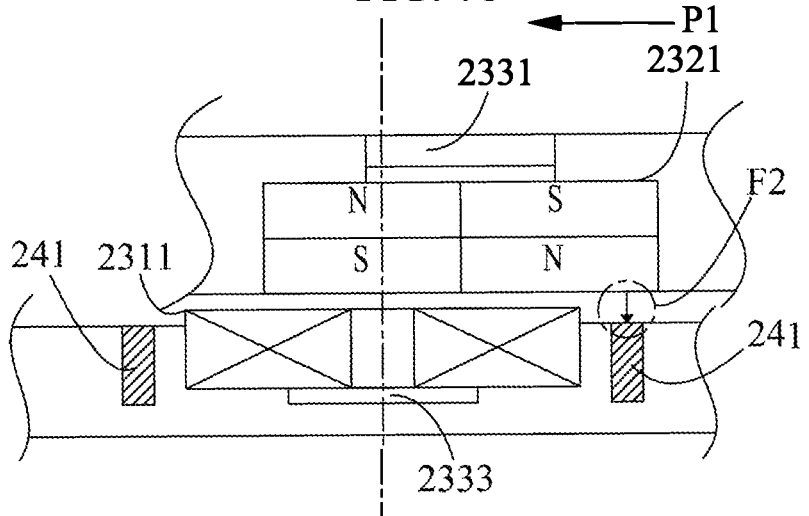
FIG. 7c is a schematic view illustrating a force being applied by the magnetic fluid body of the anti-shake mechanism of the camera device to the first magnetic steel when the camera lens moves in a direction opposite to the first direction according to the first embodiment of the disclosure.

Referring to FIG. 7a to FIG. 7C, FIG. 7a is a schematic diagram illustrating positions of the first coil 2311 and the first magnetic steel 2321 when the camera lens 1 is stable. In this case, the first coil 2311 directly faces the first magnetic steel 2321. In FIG. 7b, when the camera lens 1 is shaken by force and moves in the first direction P1, the first magnetic steel 2321 moves in the first direction P1 and keeps moving until that the first magnetic steel 2321 faces one first magnetic fluid body 241. In this case, the first magnetic fluid body 241 attracts the first magnetic steel 2321, and applies a first magnetic force F1 to the first magnetic steel 2321 to prevent the camera lens 1 from further moving in the first direction P1, thereby reducing a distance of the camera lens 1 moving along the first direction P1 during shaking. In FIG. 7c, when the camera lens 1 is shaken by force and moves in a direction opposite to the first direction P1, the first magnetic steel 2321 moves in the direction opposite to the first direction P1 and keeps moving until that the first magnetic steel 2321 faces another first magnetic fluid body 241. In this case, the first magnetic fluid body 241 attracts the first magnetic steel 2321, and applies a second magnetic force F2 to the first magnetic steel 2321 to prevent the camera lens 1 from further moving in the direction opposite to the first direction P1, thereby reducing the distance of the camera lens 1 moving in the direction opposite to the first direction P1 during shaking. Therefore, the first magnetic fluid bodies 241 located on both sides of the first coil 2311 can suppress the shake when the camera lens 1 is shaken in the first direction P1 or the direction opposite to the first direction P1.

It can be understood that when the camera lens 1 shakes in the second direction P2 or the direction opposite to the second direction P2, the two second magnetic fluid bodies 242 located on both sides of the second coil 2312 can also suppress the shake. When the shake of the camera lens 1 is detected in another direction, the four magnetic fluid bodies 24 can cooperatively suppress the shake of the lens 1 in any direction.

In some embodiments, when the at least one magnetic fluid body 24 is arranged on the supporting frame 22, the two first magnetic fluid bodies 241 can also be arranged on two opposite sides of the first magnetic steel 2321 along a direction parallel to the short axis of the first magnetic steel 2321, and the two magnetic fluid bodies 242 are respectively disposed on two opposite sides of the second magnetic steel 2322 along a direction parallel to the short axis of the second magnetic steel 2322.

Figure 8A:
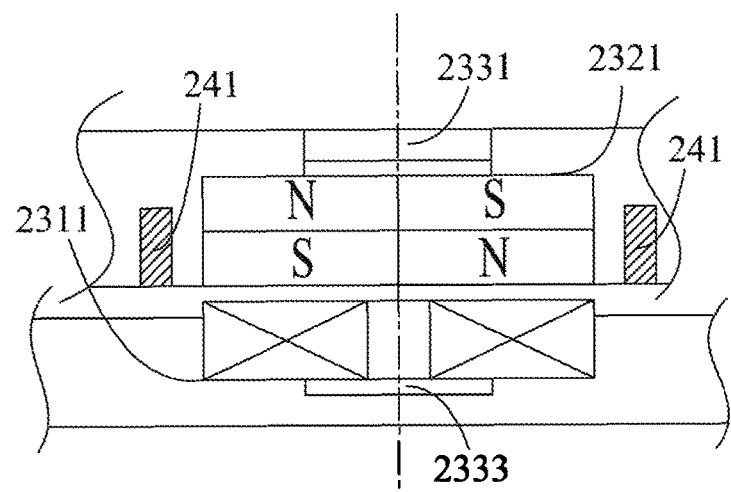
FIG. 8a is a schematic view illustrating the magnetic fluid body of the anti-shake mechanism of the camera device being disposed on the supporting frame according to the first embodiment of the disclosure.
Figure 8B:
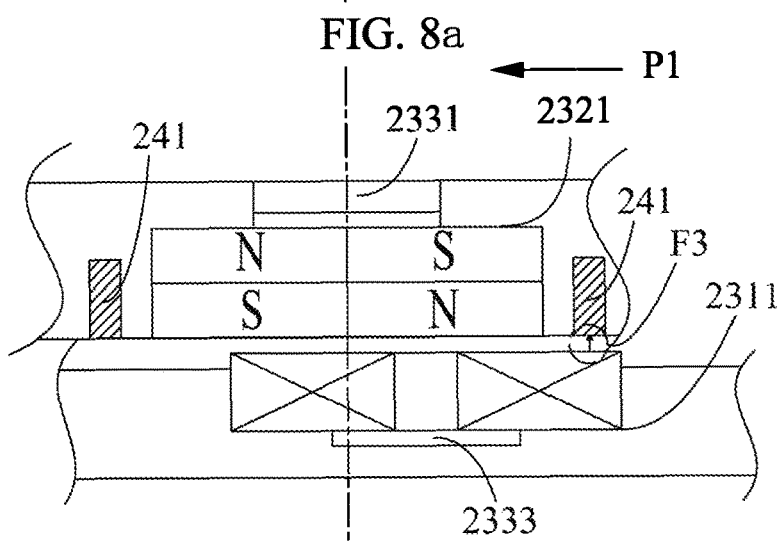
FIG. 8b is a schematic view illustrating a force being applied by the magnetic fluid body of the anti-shake mechanism of the camera device to a first coil when the camera lens moves in a first direction according to the first embodiment of the disclosure.
Figure 8C:
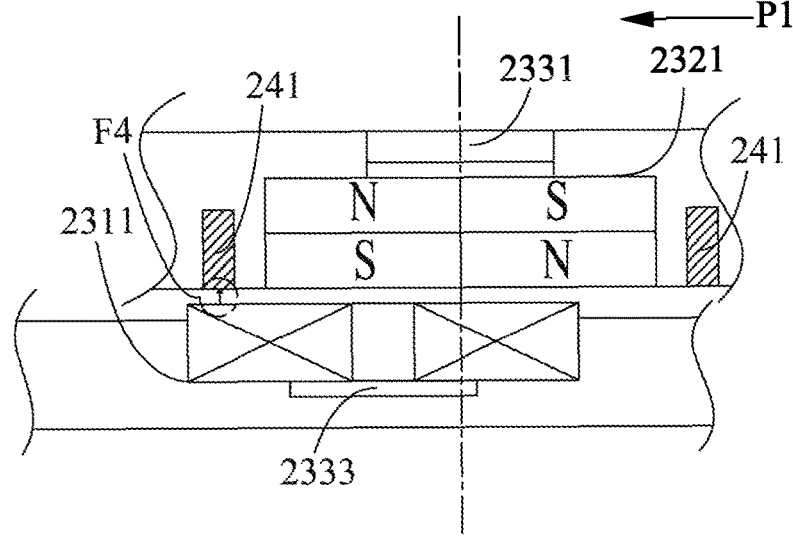
FIG. 8c is a schematic view illustrating a force being applied by the magnetic fluid body of the anti-shake mechanism of the camera device to the first coil when the camera lens moves in a direction opposite to the first direction according to the first embodiment of the disclosure.

Referring to FIG. 8a to FIG. 8c, the at least one magnetic fluid body 24 is disposed on the supporting frame 22, and the first coil 2311 and the first magnetic steel 2321 are taken as examples for illustration. FIG. 8a is a schematic diagram illustrating positions of the first coil 2311 and the first magnetic steel 2321 when the camera lens 1 is stable. In this case, the first coil 2311 directly faces the first magnetic steel 2321. In FIG. 8b, when the camera lens 1 is shaken by force and moves in the first direction P1, the first magnetic steel 2321 moves in the first direction P1 with respect to the first coil 2311, and moves to a position where the first coil 2311 faces one first magnetic fluid body 241. In this case, the first magnetic fluid body 241 attracts the first coil 2311 and applies a third magnetic force F3 to the first coil 2311. Since the first coil 2311 is fixed to the base 21, a reaction force of the third magnetic force F3 brakes the first magnetic steel 2321, thereby preventing the camera lens 1 from further moving in the first direction P1 and reducing the distance of the camera lens 1 moving along the first direction P1 during shaking. In FIG. 8c, when the camera lens 1 is shaken by force and moves in the direction opposite to the first direction P1, the first magnetic steel 2321 moves in the direction opposite to the first direction P1 and moves to a position where the first coil 2311 faces another first magnetic fluid body 241. In this case, the first magnetic fluid body 241 attracts the first coil 2311 and applies a fourth magnetic force F4 to the first coil 2311 to prevent the camera lens 1 from further moving in the direction opposite to the first direction P1, thereby reducing the distance of the camera lens 1 moving in the direction opposite to the first direction P1 during shaking. Thus, when the camera lens 1 is shaken in the first direction P1 or the direction opposite to the first direction P1, the first magnetic fluid bodies 241 located on both sides of the first magnetic steel 2321 can suppress the shake.

It can be understood that when the camera lens 1 shakes in the second direction P2 or the direction opposite to the second direction P2, the two second magnetic fluid bodies 242 located on both sides of the second magnetic steel 2322 can also suppress the shake. When the shake of the camera lens 1 is detected in another direction, the four magnetic fluid bodies 24 cooperatively suppress the shake of the camera lens 1 in any direction.

Figure 9A:
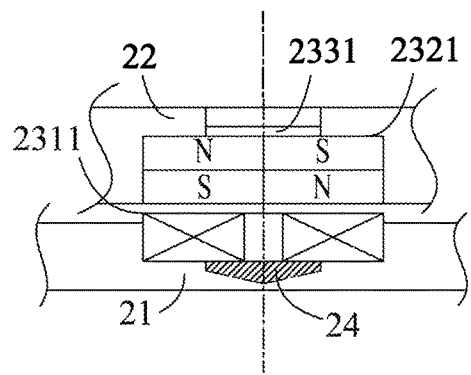
FIG. 9a is a schematic view of arrangement of another magnetic fluid body according to the first embodiment of the disclosure.
Figure 9B:
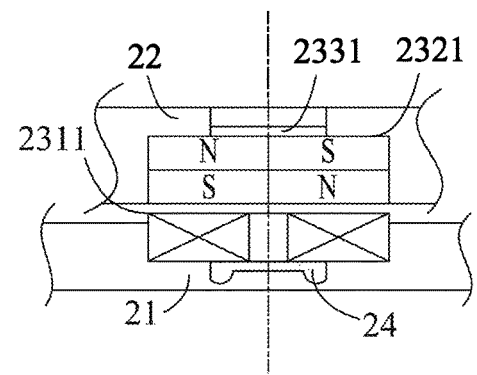
FIG. 9b is a schematic view of arrangement of yet another magnetic fluid body according to the first embodiment of the disclosure.

Referring also to FIG. 9a and FIG. 9b, in other embodiments, the magnet yoke 233 does not include a third magnet yoke 2333 and a fourth magnet yoke 2334. There are two magnetic fluid bodies 24. One of the two magnetic fluid bodies 24 is disposed on a side of the first coil 2311 facing away from the first magnetic steel 2321 and the other of the two magnetic fluid bodies 24 is disposed on a side of the second coil 2312 facing away from the second magnetic steel 2322.

Specifically, the first coil 2311 and the first magnetic steel 2321 are taken as examples for illustration. In embodiments, one magnetic fluid body 24 replaces the third magnet yoke 2333. In this case, the first magnetic steel 2321 can be used as a spring with good controllability within a moving range of the supporting frame 22. In this case, there is no needs to arrange the magnetic fluid bodies 24 on both sides of the first coil 2311, such that the number of components of the camera device can be further reduced, thereby reducing the weight of the camera device and realizing a lightweight design of the camera device.

Alternatively, for the second coil 2312 and the first magnetic steel 2322, another magnetic fluid body 24 may be used to replace the fourth magnet yoke 2334, which has the same beneficial effect as using the magnetic fluid body 24 to replace the third magnet yoke 2333.

It can be understood that the magnetic fluid body 24 may also be used to replace the first magnet yoke 2331 and the second magnet yoke 2332. The disclosure is not limited thereto.

In embodiments, the anti-shake mechanism 2 further includes a housing 25. The base 21 and the housing 25 cooperatively define a receiving space. The supporting frame 22 and the driving member 23 are both located in the receiving space. The housing 25 defines a through hole. The camera lens 1 extends out of the receiving space from the through hole.

Figure 10:
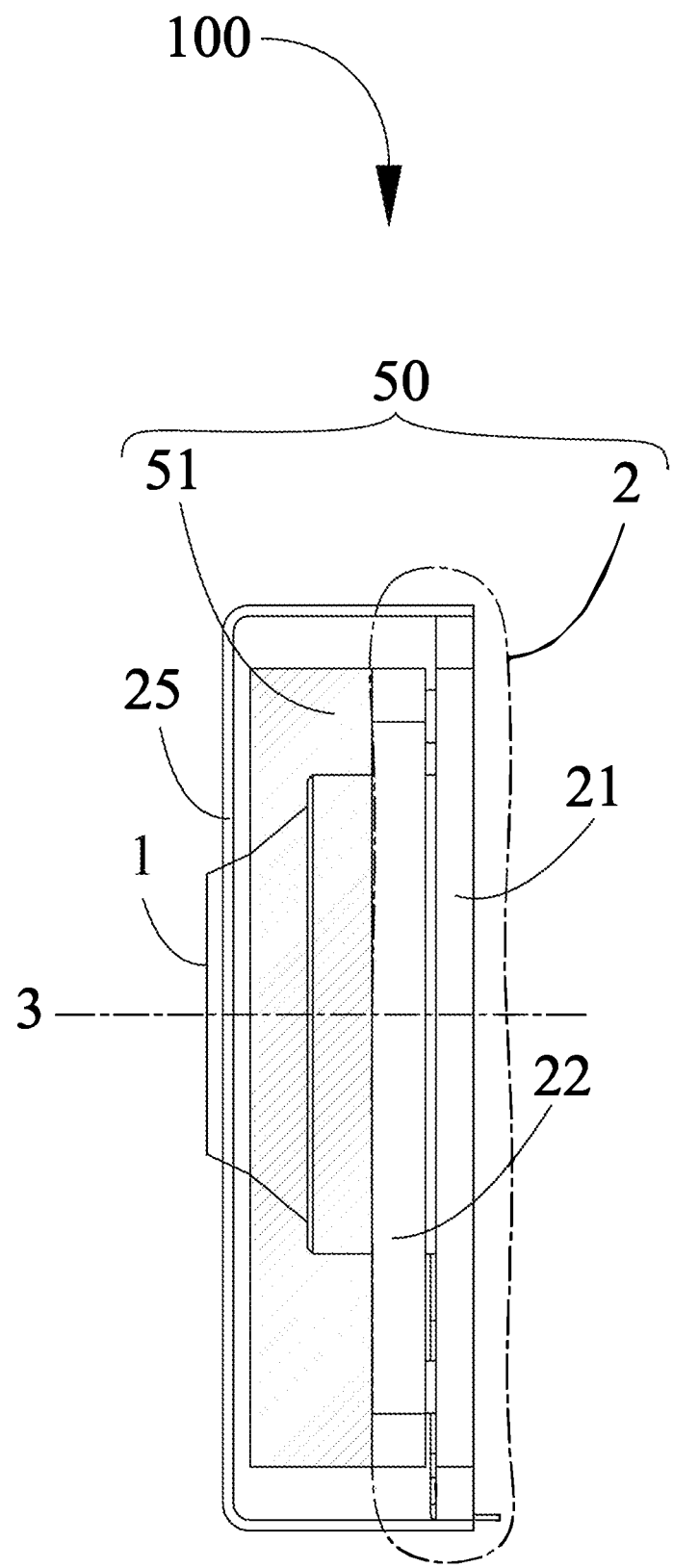
FIG. 10 is a schematic view of a camera device having a focusing mechanism according to a first embodiment of the disclosure.

Referring to FIG. 10, in the embodiments of the disclosure, the camera device further includes a focusing mechanism 51. The focusing mechanism 51 is disposed on a side of the supporting frame 22 facing away from the base 21. The focusing mechanism 51 is configured to drive the anti-shake mechanism 2 to realize focusing. The anti-shake mechanism 2 and the focusing mechanism 51 together constitute a lens driving device 50.

Figure 11:
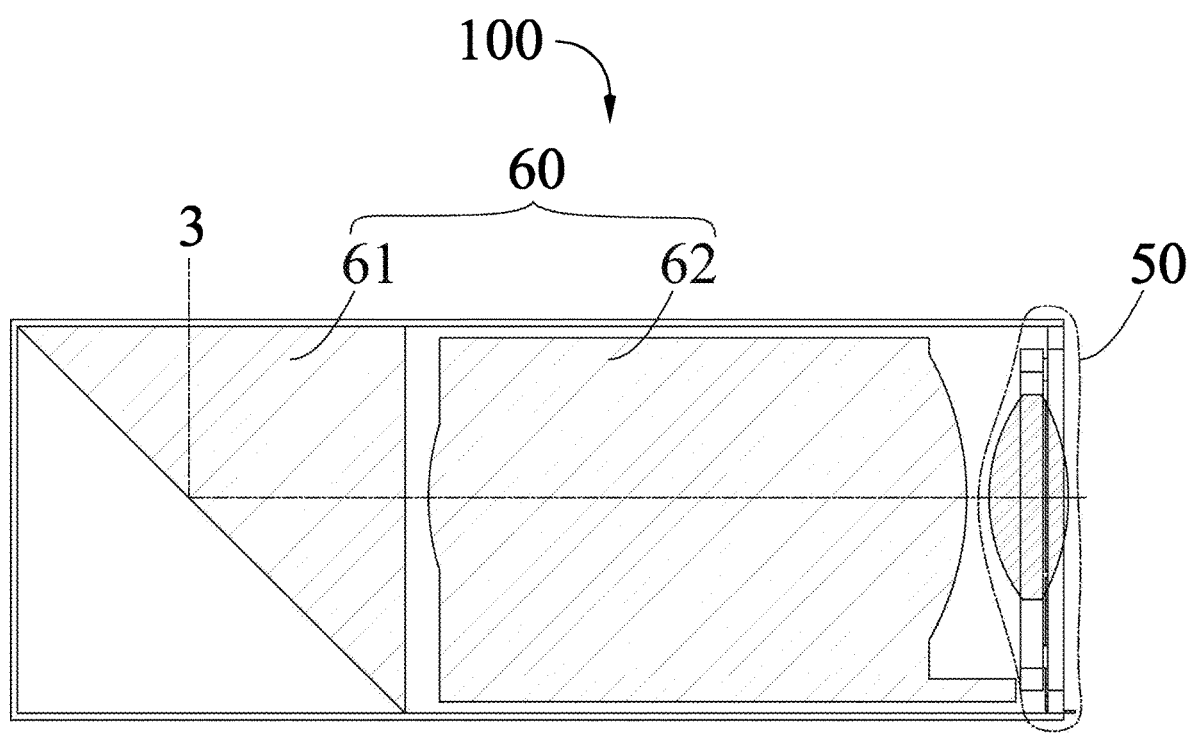
FIG. 11 is a schematic view of a camera device having a curved optical mechanism according to a first embodiment of the disclosure.

Referring to FIG. 11, in embodiments of the disclosure, the camera device further includes a curved optical mechanism 60. The curved optical mechanism 60 includes a prism 61 for changing an extending direction of the optical axis 3 and a light guiding lens 62. The lens driving device 50 is provided at an end of the light guiding lens 62 away from the prism 61, so that the light perpendicularly incident on the prism 61 is refracted by the prism 61, enters the lens 1 of the lens driving device 50 through the light guiding lens 62, is adjusted by the focusing mechanism 51 and the anti-shake mechanism 2 of the lens driving device 50, and finally is emitted to the imaging element.

It can be understood that the curved optical mechanism 60 may be a periscope camera lens. The curved optical mechanism 60 is mainly used for optical systems having a relatively long optical path. When the curved optical mechanism 60 is applied to a portable terminal such as a smart phone, even in a thin portable terminal, a long optical path can be obtained, thereby realizing telephoto imaging. The curved optical mechanism 60 is easily affected by shake. However, the anti-shake mechanism 2 provided in embodiments can perform high-precision shake correction on the curved optical mechanism 60, thereby greatly improving the usability of the camera device.

Figure 12:
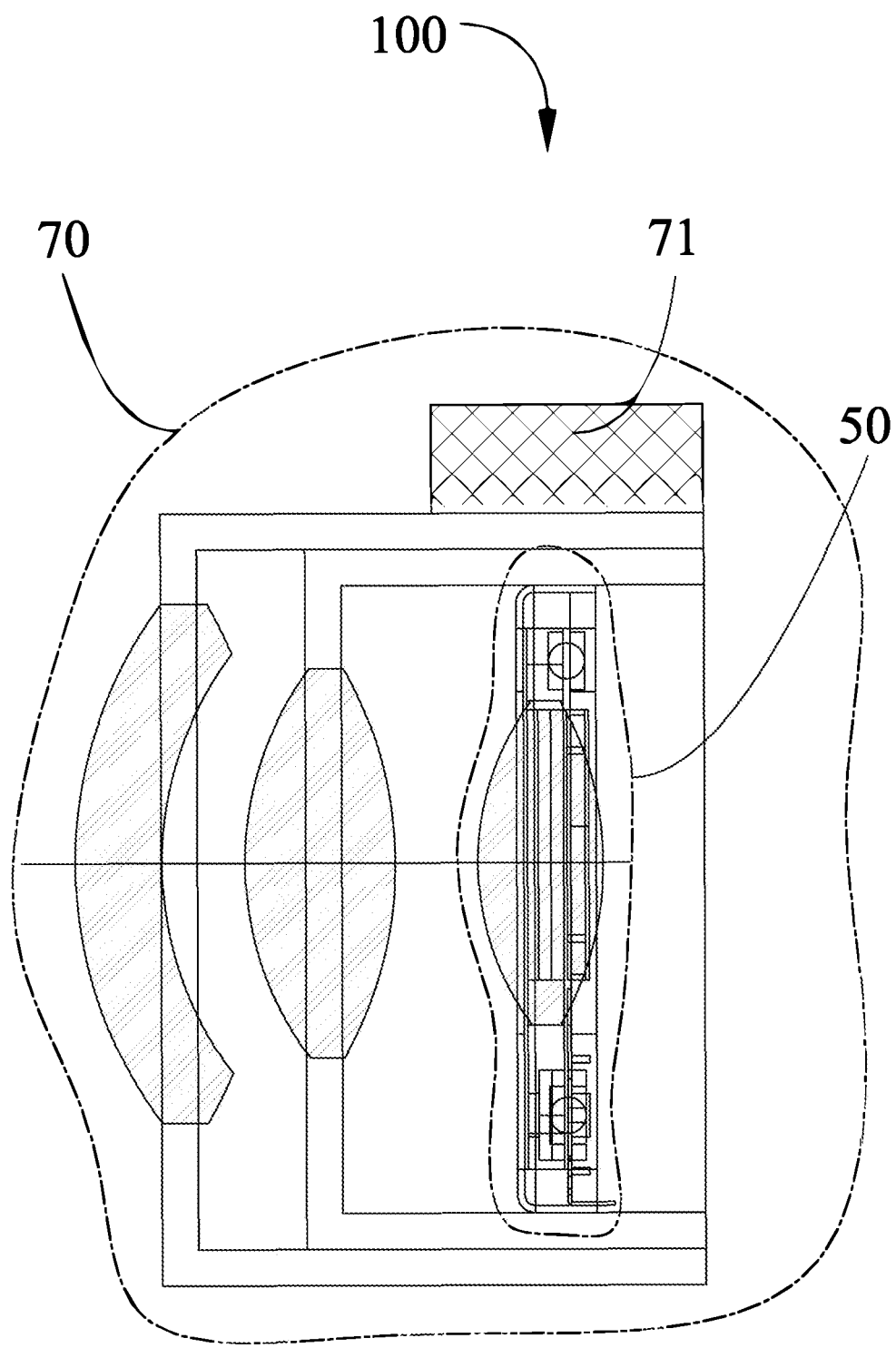
FIG. 12 is a schematic view of a camera device having a telescopic zoom mechanism according to a first embodiment of the disclosure.

Referring to FIG. 12, in embodiments, the camera device further includes a telescopic zoom mechanism 70. The telescopic zoom mechanism 70 can be extended out of or retracted into along the optical axis 3 under the driving of a driving motor 71.

The telescopic zoom mechanism 70 is a telephoto imaging system or an optical zoom system that changes a focal length by moving a position of the optical lens. Similar to the aforementioned curved optical mechanism 60, the telescopic zoom mechanism 70 is easily affected by shake. With the anti-shake mechanism 2 provided in embodiments, high-precision shake correction can be performed to improve the usability of the camera device.

In the related technologies, the suspension wire is used to support the camera lens 1, and the suspension wire needs to be bent to drive the lens 1. In practical situations, when the telescopic zoom device 70 is applied to a portable electronic device such as a smart phone, it is necessary to make the portable electronic device thinner. In this case, the base 21, the supporting frame 22, and the supporting member 222 provided in embodiments can further improve the design level, such that the telescopic zoom mechanism 70 can be smoothly mounted on the smart phone.

Figure 13:
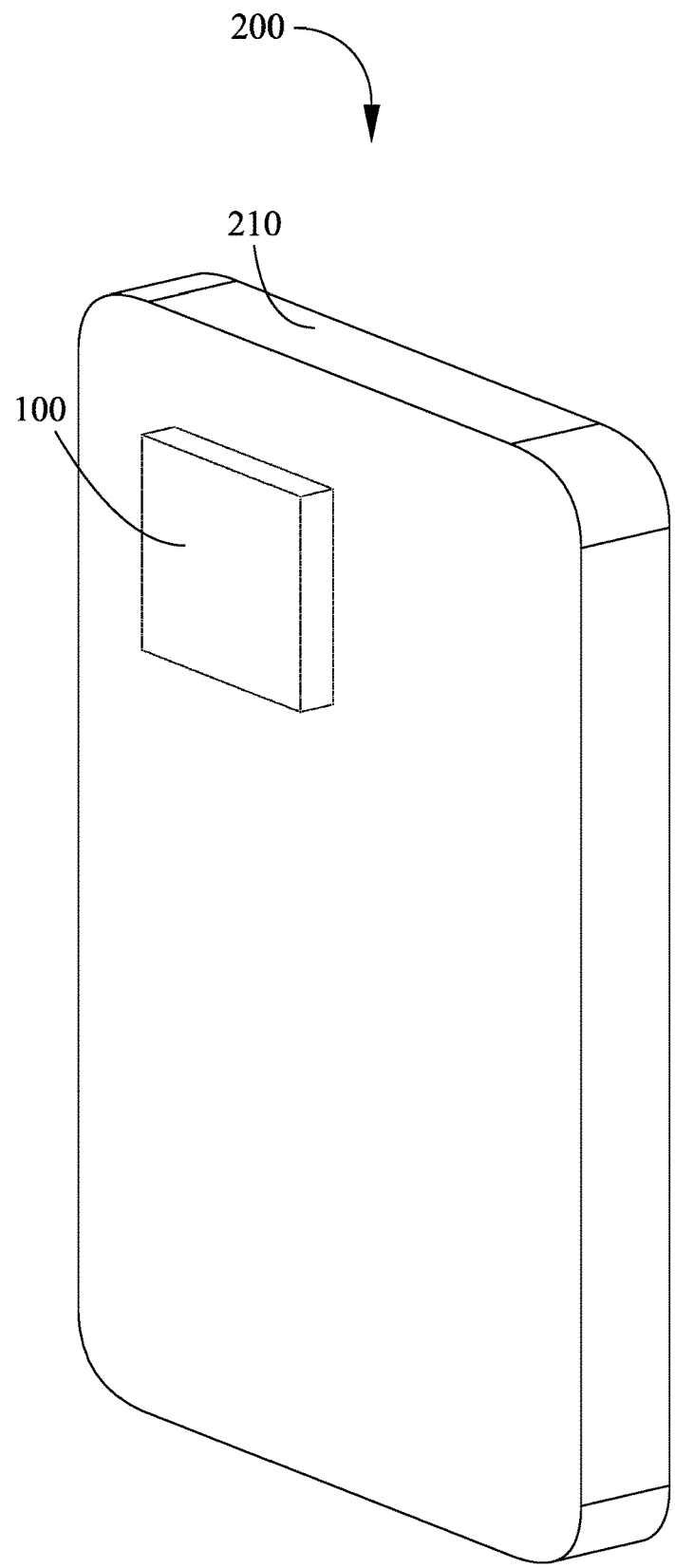
FIG. 13 is a schematic structural view of a portable electronic device according to a second embodiment of the disclosure.

A second embodiment of the disclosure relates to a portable electronic device 200. As illustrated in FIG. 13, the portable electronic device 200 includes a device body 210 and the camera device 100 of the first embodiment described above.

The camera device and the portable electronic device provided in the embodiments of the disclosure are described in detail. In this disclosure, specific examples are used to explain the principle and implementation of the disclosure. The above description of the implementation is only used to help understand the disclosure, and there will be changes in the specific implementation and application scope. In summary, the contents of this specification should not be understood as limiting the disclosure.

What is claimed is:

1. A camera device, comprising:
a camera lens; and
an anti-shake mechanism, wherein the anti-shake mechanism includes a base, a supporting frame, a driving member, and a supporting member, wherein the camera lens is fixed to the supporting frame, wherein
the driving member comprises at least one coil and at least one magnetic steel, wherein the driving member is configured to drive the supporting frame to move relative to the base in a direction perpendicular to an optical axis, and the supporting member is arranged between the supporting frame and the base to support movement of the supporting frame; and
the anti-shake mechanism further comprises at least one magnetic fluid body arranged on at least one of the base and the supporting frame;
the supporting member is a ball.

2. The camera device of claim 1, wherein the at least one coil is fixed to the base and the at least one magnetic steel is fixed to the supporting frame; or the at least one coil is fixed to the supporting frame and the at least one magnetic steel is fixed to the base.

3. The camera device of claim 2, wherein the driving member comprises a first driving member and second driving member, wherein
the first driving member is configured to drive the supporting frame to move in a direction parallel to a first direction; and
the second driving member is configured to drive the supporting frame to move in a direction parallel to a second direction, wherein
the first direction and the second direction are perpendicular to each other.

4. The camera device of claim 3, wherein the first driving member comprises a first magnetic steel fixed to the supporting frame and a first coil fixed to the base, and the second driving member comprises a second magnetic steel fixed to the supporting frame and a second coil fixed to the base.

5. The camera device of claim 4, wherein the at least one magnetic fluid body comprises two first magnetic fluid bodies arranged in a direction parallel to a short axis of the first coil and two second magnetic fluid bodies arranged in a direction parallel to a short axis of the second coil, wherein
one first magnetic fluid body of the two first magnetic fluid bodies is arranged on one side of the first coil and an other first magnetic fluid body of the two first magnetic fluid bodies is arranged on another side of the first coil; and
one second magnetic fluid body of the two second magnetic fluid bodies is arranged on one side of the second coil and an other second magnetic fluid body of the two second magnetic fluid bodies is arranged on another side of the second coil.

6. The camera device of claim 4, wherein the at least one magnetic fluid body comprises two first magnetic fluid bodies arranged in a direction parallel to a short axis of the first magnetic steel and two second magnetic fluid bodies arranged in a direction parallel to a short axis of the second magnetic steel, wherein
one first magnetic fluid body of the two first magnetic fluid bodies is arranged on one side of the first magnetic steel and an other first magnetic fluid body of the two first magnetic fluid bodies is arranged on another side of the first magnetic steel; and
one second magnetic fluid body of the two second magnetic fluid bodies is arranged on one side of the second magnetic steel and an other second magnetic fluid body of the two second magnetic fluid bodies is arranged on another side of the second magnetic steel.

7. The camera device of claim 3, wherein the first driving member comprises a first magnetic steel fixed to the base and a first coil fixed to the supporting frame, and the second driving member comprises a second magnetic steel fixed to the base and a second coil fixed to the supporting frame.

8. The camera device of claim 7, wherein the at least one magnetic fluid body comprises two first magnetic fluid bodies arranged in a direction parallel to a short axis of the first coil and two second magnetic fluid bodies arranged in a direction parallel to a short axis of the second coil, wherein
one first magnetic fluid body of the two first magnetic fluid bodies is arranged on one side of the first coil and an other first magnetic fluid body of the two first magnetic fluid bodies is arranged on another side of the first coil; and
one second magnetic fluid body of the two second mag-netic fluid bodies is arranged on one side of the second coil and an other second magnetic fluid body of the two second magnetic fluid bodies is arranged on another side of the second coil.

9. The camera device of claim 7, wherein the at least one magnetic fluid body comprises two first magnetic fluid bodies arranged in a direction parallel to a short axis of the first magnetic steel and two second magnetic fluid bodies arranged in a direction parallel to a short axis of the second magnetic steel, wherein
one first magnetic fluid body of the two first magnetic fluid bodies is arranged on one side of the first magnetic steel and an other first magnetic fluid body of the two first magnetic fluid bodies is arranged on another side of the first magnetic steel; and
one second magnetic fluid body of the two second magnetic fluid bodies is arranged on one side of the second magnetic steel and an other second magnetic fluid body of the two second magnetic fluid bodies is arranged on another side of the second magnetic steel.

10. The camera device of claim 1, wherein the driving member comprises a corresponding magnet yoke fixed to a side of each magnetic steel of the at least one magnetic steel away from the at least one coil and a corresponding first magnetic fluid body fixed to a side of each coil of the at least one coil away from the at least one magnetic steel.

11. The camera device of claim 1, further comprising a focusing mechanism provided on a side of the supporting frame away from the base, wherein the focusing mechanism is configured to drive the camera lens to move in a direction parallel to the optical axis to realize focusing.

12. The camera device of claim 1, further comprising a curved optical mechanism, wherein the curved optical mechanism comprises a prism and a light guiding lens, wherein the prism is configured to change an extending direction of the optical axis.

13. The camera device of claim 1, further comprising a telescopic zoom mechanism, wherein the telescopic zoom mechanism is configured to be extended out of or retracted into along the optical axis.

14. A portable electronic device comprising a device body and a camera device, wherein the camera device comprises:
a camera lens; and
an anti-shake mechanism, wherein the anti-shake mechanism includes a base, a supporting frame, a driving member, and a supporting member, wherein the camera lens is fixed to the supporting frame, wherein
the driving member comprises at least one coil and at least one magnetic steel, wherein the driving member is configured to drive the supporting frame to move relative to the base in a direction perpendicular to an optical axis, and the supporting member is arranged between the supporting frame and the base to support movement of the supporting frame; and
the anti-shake mechanism further comprises at least one magnetic fluid body arranged on at least one of the base and the supporting frame;
the driving member comprises a corresponding magnet yoke fixed to a side of each magnetic steel of the at least one magnetic steel away from the at least one coil and a corresponding first magnetic fluid body fixed to a side of each coil of the at least one coil away from the at least one magnetic steel.

15. The portable electronic device of claim 14, wherein the at least one coil is fixed to the base and the at least one magnetic steel is fixed to the supporting frame; or
the at least one coil is fixed to the supporting frame and the at least one magnetic steel is fixed to the base.

16. The portable electronic device of claim 15, wherein the driving member comprises a first driving member and second driving member, wherein
the first driving member is configured to drive the supporting frame to move in a direction parallel to a first direction; and
the second driving member is configured to drive the supporting frame to move in a direction parallel to a second direction, wherein
the first direction and the second direction are perpendicular to each other.

17. The portable electronic device of claim 16, wherein the first driving member comprises a first magnetic steel fixed to the supporting frame and a first coil fixed to the base, and the second driving member comprises a second magnetic steel fixed to the supporting frame and a second coil fixed to the base.

18. The portable electronic device of claim 17, wherein the at least one magnetic fluid body comprises two first magnetic fluid bodies arranged in a direction parallel to a short axis of the first coil and two second magnetic fluid bodies arranged in a direction parallel to a short axis of the second coil, wherein
one first magnetic fluid body of the two first magnetic fluid bodies is arranged on one side of the first coil and an other first magnetic fluid body of the two first magnetic fluid bodies is arranged on another side of the first coil; and
one second magnetic fluid body of the two second magnetic fluid bodies is arranged on one side of the second coil and an other second magnetic fluid body of the two second magnetic fluid bodies is arranged on another side of the second coil.

* * * * *